US007266440B2

(12) United States Patent
Ikemoto et al.

(10) Patent No.: US 7,266,440 B2
(45) Date of Patent: Sep. 4, 2007

(54) AIR/FUEL RATIO CONTROL SYSTEM FOR AUTOMOTIVE VEHICLE USING FEEDBACK CONTROL

(75) Inventors: Noriaki Ikemoto, Oobu (JP); Hisashi Iida, Kariya (JP)

(73) Assignee: DENSO Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/259,068

(22) Filed: Oct. 27, 2005

(65) Prior Publication Data

US 2006/0137325 A1 Jun. 29, 2006

Related U.S. Application Data

(63) Continuation-in-part of application No. 11/020,569, filed on Dec. 27, 2004, now abandoned.

(51) Int. Cl.
*G06F 19/00* (2006.01)
*F02D 41/14* (2006.01)
*F01N 3/20* (2006.01)

(52) U.S. Cl. .......................... 701/109; 60/276; 60/285

(58) Field of Classification Search .................. 60/274, 60/276, 277, 284, 285, 297, 299–301; 73/116, 73/117.3, 118.1; 701/103, 109; 123/672, 123/679

See application file for complete search history.

(56) References Cited

U.S. PATENT DOCUMENTS 5,390,489 A * 2/1995 Kawai et al. ................. 60/276
5,425,234 A * 6/1995 Ohuchi et al. ................ 60/276
5,537,817 A 7/1996 Akazaki et al.
5,551,231 A * 9/1996 Tanaka et al. ................ 60/289
5,640,846 A * 6/1997 Ohuchi et al. ................ 60/276
5,657,627 A * 8/1997 Akazaki et al. ................ 60/276
5,692,486 A * 12/1997 Tsutsumi et al. ........... 123/688
5,806,012 A * 9/1998 Maki et al. ................. 701/104
5,983,629 A * 11/1999 Sawada ....................... 60/276
6,256,981 B1 * 7/2001 Sullivan et al. ............... 60/274
6,256,983 B1 * 7/2001 Yasui .......................... 60/285
6,338,243 B1 * 1/2002 Takaoka et al. .............. 60/277
6,347,514 B1 * 2/2002 Takahashi et al. ............ 60/285
6,438,946 B1 * 8/2002 Majima et al. ............... 60/285
6,539,707 B2 * 4/2003 Ikemoto et al. ............... 60/285
6,775,608 B2 * 8/2004 Yasui ......................... 701/109

(Continued)

FOREIGN PATENT DOCUMENTS

JP 61268838 A * 11/1986 .................. 60/276

(Continued)

*Primary Examiner*—Willis R. Wolfe, Jr.
(74) *Attorney, Agent, or Firm*—Nixon & Vanderhye P.C.

(57) ABSTRACT

An simplified structure of an air-fuel ratio control system for an internal combustion engine includes an upstream and a downstream catalytic device installed in an exhaust pipe of the engine and a first, a second, and a third air-fuel ratio sensor installed in upstream or downstream side of the exhaust pipe. The system also includes a first feedback controller working to bring a value of the air-fuel ratio, as measured by the first air-fuel ratio sensor, into agreement with a target one and a second feedback controller working to sample values of the air-fuel ratios, as measured by the second and third air-fuel ratio sensors, to correct a predetermined controlled parameter in the feedback control of the first feedback controller.

17 Claims, 7 Drawing Sheets

U.S. PATENT DOCUMENTS 6,941,745 B2 * 9/2005 Ikemoto et al. ............... 60/285

FOREIGN PATENT DOCUMENTS

JP 2-67443 3/1990
JP 04017747 A * 1/1992 .................. 60/276
JP 5-321651 12/1993
JP 6-294342 10/1994
JP 8-14088 1/1996

* cited by examiner

AIR/FUEL RATIO CONTROL SYSTEM FOR AUTOMOTIVE VEHICLE USING FEEDBACK CONTROL

This is a Continuation-In-Part application of U.S. Ser. No. 11/020,569, filed 27 Dec. 2004, which claimed priority of JP 2003-432627, filed 26 Dec. 2003. The entire contents of each of these applications are incorporated herein by reference.

CROSS REFERENCE TO RELATED DOCUMENT

The present application is a continuation-in-part application of Ser. No. 11/020,569 filed on Dec. 27, 2004 (now abandoned) and claims the benefit of Japanese Patent Application No. 2004-137581 filed on May 6, 2004, the disclosure of which is incorporated herein by reference.

BACKGROUND OF THE INVENTION

1. Technical Field of the Invention

The present invention relates generally to an air-fuel ratio control system for internal combustion engines, and more particularly to such a system designed to perform feedback control on an air-fuel ratio of the engine using outputs of air-fuel ratio sensors.

2. Background Art

There are known air-fuel ratio control systems for internal combustion engines which have air-fuel ratio sensors installed upstream and downstream of an exhaust emission control catalytic device disposed in an exhaust pipe of the engine and use outputs of the air-fuel ratio sensors to control the air-fuel ratio of the engine for enhancing the emission control. For example, Japanese Patent First Publication No. 2-67443 discloses such a system. There are also known anther type of air-fuel ratio control systems which have a first catalytic device and a second catalytic device arrayed in upstream and downstream sides of an exhaust pipe and a first and a second air-fuel ratio sensors installed upstream and downstream of the first catalytic device, and use outputs of the first and second air-fuel ratio sensors to control the air-fuel ratio of the engine for enhancing the emission control. For example, Japanese Patent First Publication No. 5-321651 discloses such a system.

The former systems must be increased in size of the catalytic device in order to ensure a desired degree of emission control using the single catalytic device. The use of the two air-fuel ratio sensors disposed upstream and downstream of the catalytic device may also result in a lack of a control response rate. The latter systems have a difficulty in monitoring the exhaust gas emitted ultimately outside the exhaust pipe (i.e., from the second catalytic device), thus resulting in a deterioration of the emissions.

There are further known air-fuel ratio control systems which have a first catalytic device and a second catalytic device arrayed in upstream and downstream sides of an exhaust pipe, a first air-fuel ratio sensor installed upstream of the first catalytic device, a second air-fuel ratio sensor interposed between the first and second catalytic devices, and a third air-fuel ratio sensor installed downstream of the second catalytic device. The systems also include a first, second, and third feedback controllers. The first feedback controller works to bring the air-fuel ratio of a mixture supplied to the engine into agreement with a target one using an output of the first air-fuel ratio sensor in feedback control. The second feedback controller works to determine a parameter controlled by the first feedback controller using an output of the second air-fuel ratio. The third feedback controller works determine a parameter controlled by the second feedback controller using an output of the third air-fuel ratio. For example, Japanese Patent First Publication No. 8-14088 (U.S. Pat. No. 5,537,817) discloses such a system.

The above type of control systems are designed to perform the feedback control three times, thus resulting in complexity of the system structure. Additionally, time lags of response to flows of the exhaust gas downstream of the catalytic devices occur, thereby causing the second and third feedback controller to interfere in operation with each other, which leads to the instability of the operations thereof. For example, when the air-fuel ratio varies at high frequencies, it may cause the output of the second air-fuel ratio sensor to have a fuel rich value and the output of the third air-fuel ratio sensor to have a fuel lean value. This may cause the second and third feedback controller to interfere in operation, thus resulting in the instability of the operations thereof.

SUMMARY OF THE INVENTION

It is therefore a principal object of the invention to avoid the disadvantages of the prior art.

It is another object of the invention to provide a simplified structure of an air-fuel ratio control system for internal combustion engines which is designed to optimize a control response and exhaust emissions.

According to one aspect of the invention, there is provided an air-fuel ratio control system for an internal combustion engine which comprises: (a) a catalytic device to be installed in an exhaust pipe of an internal combustion engine; (b) a first air-fuel ratio sensor to be installed in the exhaust pipe upstream of the catalytic device to measure an air-fuel ratio of an exhaust gas flowing through the exhaust pipe; (c) a second air-fuel ratio sensor to be installed in the exhaust pipe downstream of the catalytic device to measure an air-fuel ratio of the exhaust gas flowing through the exhaust pipe; and (d) a feedback circuit working to determine a preselected controlled parameter based on the air-fuel ratios, as measured by the first and second air-fuel ratio sensors, and perform air-fuel ratio feedback control.

Specifically, the engine control system works to deal with two outputs from the first and second air-fuel ratio sensors as a single output (i.e., the controlled parameter) for use in the air-fuel ratio feedback control. This results in simplicity of the air-fuel ratio control as compared with conventional air-fuel ratio control systems designed to perform the feedback control multiple times using multiple sensor outputs and also avoids interference between the feedback controls to ensure the quality of exhaust emissions discharged outside the exhaust pipe.

The feedback circuit calculates, as the controlled parameter, a virtual air-fuel ratio between the first and second air-fuel ratio sensors using the air-fuel ratios measured by the first and second air-fuel ratio sensors and performs the air-fuel ratio feedback control to bring the virtual air-fuel ration into agreement with a target one. The virtual air-fuel ratio is an air-fuel ratio of the exhaust gas within the catalytic device.

The feedback circuit may multiply the air-fuel ratios measured by the first and second air-fuel ratio sensors by given weighting factors, respectively, to determine the controlled parameter. For instance, when the catalytic device is active to clean up the exhaust gas sufficiently, the feedback circuit may weight the air-fuel ratio, as measured by the first air-fuel ratio sensor, to determine the controlled parameter. Conversely, when the catalytic device is less active, the feedback circuit may weight the air-fuel ratio, as measured by the second air-fuel ratio sensor, to determine the controlled parameter. This ensures the stability of response of the system and enhance control of emissions from the engine.

The system may further include a running condition detector working to detect a running condition of the internal combustion engine. The feedback circuit determines the weighing factors based on the running condition, as detected by the running condition detector.

The running condition detector may include a flow rate sensor working to measure a flow rate of the exhaust gas. The feedback circuit may determine the weighing factors based on the flow rate, as measured by the flow rate sensor. For instance, as the flow rate of the exhaust gas increases, the feedback circuit decreases the weighting factor for the air-fuel ratio measured by the first air-fuel ratio sensor, while increasing the weighting factor for the air-fuel ratio measured by the second air-fuel ratio sensor.

The system may further include a deterioration detector working to detect a deterioration of the catalytic device. The feedback circuit may determine the weighing factors based on a degree of the deterioration of the catalytic device, as detected by the deterioration detector. This compensates for a change in activity of the catalytic device caused by the deterioration thereof. For instance, as the degree of deterioration of the catalytic device increases, the feedback circuit decreases the weighting factor for the air-fuel ratio measured by the first air-fuel ratio sensor, while increasing the weighting factor for the air-fuel ratio measured by the second air-fuel ratio sensor.

The feedback circuit may use a model in which the air-fuel ratio, as measured by the first air-fuel ratio sensor is handled as an input, and the air-fuel ratio, as measured by the second air-fuel ratio sensor is handled as an output and which estimates a state variable between the input and the output using a state estimator for the model to determine the controlled parameter. The use of the model results in improved control accuracy.

According to another aspect of the invention, there is provided an air-fuel ratio controls system for an internal combustion engine which comprises: (a) an upstream catalytic device installed in an exhaust pipe of an internal combustion engine; (b) a downstream catalytic device installed in the exhaust pipe downstream of the upstream catalytic device; (c) a first, a second, and a third air-fuel ratio sensor each working to measure an air-fuel ratio of an exhaust gas flowing through the exhaust pipe, the first air-fuel ratio sensor being disposed upstream of the upstream catalytic device, the second air-fuel ratio sensor being disposed between the upstream and downstream catalytic devices, the third air-fuel ratio sensor being disposed downstream of the downstream catalytic device; (d) a first feedback controller working to perform feedback control to bring a value of the air-fuel ratio, as measured by the first air-fuel ratio sensor, into agreement with a target air-fuel ratio; and (e) a second feedback controller working to sample values of the air-fuel ratios, as measured by the second and third air-fuel ratio sensors, to correct a predetermined controlled parameter in the feedback control of the first feedback controller. For example, the controlled parameter is a target air-fuel ratio, a feedback correction factor, or a feedback gain.

Specifically, the second feedback controller manipulates the values of the air-fuel ratios measured by two sensors: the second and third air-fuel ratio sensors, as one measured by a single sensor, thus resulting in a decreased operation load on the system as compared with conventional air-fuel ratio control systems, as discussed in the introductory part of this application, which are designed to perform feedback control three times. This permits the structure of the air-fuel ratio control system to be simplified without sacrificing the ability of controlling the air-fuel ratio and improving the response rate of the system to ensure desired quality of exhaust gas ultimately emitted out of the exhaust pipe of the engine.

In the preferred mode of the invention, the second feedback controller calculates a virtual air-fuel ratio between the second and third air-fuel ratio sensors based on the values of the air-fuel ratios, as measured by the second and third air-fuel ratio sensor and corrects the controlled parameter in the first feedback controller using the virtual air-fuel ratio.

The second feedback controller may also multiply the values of the air-fuel ratios, as measured by the second and third air-fuel ratio sensor, by given weighting factors, respectively, to correct the controlled parameter in the first feedback controller. For example, use of the weighting factors allows the second feedback controller to correct the controlled parameter mainly based on the value of the air-fuel ratio, as measured by the second air-fuel ratio sensor, when the upstream catalytic device is active enough to reduce polluting emissions from the engine, while it allows the second feedback controller to correct the controlled parameter mainly based on the value of the air-fuel ratio, as measured by the third air-fuel ratio sensor, when the upstream catalytic device is not active enough to reduce polluting emissions from the engine. This maintains the desired quantity of exhaust gas without sacrificing the response rate of the controller.

The system also includes an operating condition monitor which works to monitor an operating condition of the internal combustion engine. The second feedback controller calculates the weighting factors as a function of the operating condition, as monitored by the operating condition monitor. Specifically, the weighting factors are changed following a change in the operating condition of the engine, thereby controlling the exhaust emissions from the engine effectively. Usually, a change in the operating condition of the engine results in a change in harmful emission reducing efficiency of the upstream catalytic device. Even in such an event, the system is capable of ensuring the desired quantity of the exhaust gas from the engine. The operating conditions of the engine is, for example, the speed of the engine, the quantity of intake air into the engine, the load on the engine, the temperature of the exhaust gas, the temperature of catalyst or the air-fuel ratio.

The upstream catalytic device may experience a drop in the harmful emission reducing efficiency upon a change in flow rate of the exhaust gas. To alleviate this drawback, the system may also include a sensor which measures a flow rate of the exhaust gas flowing through the exhaust pipe. The second feedback controller uses the measured flow rate as the operating condition of the engine to determine the weighting factors. Specifically, the second feedback controller decreases the weighting factor for the value of the air-fuel ratio, as measured by the second air-fuel ratio sensor, and decreases weighting factor for the value of the air-fuel ratio, as measured by the third air-fuel ratio sensor, as the flow rate of the exhaust gas increases.

When the deterioration of the upstream catalytic device progresses, it will result in a drop in the harmful emission reducing efficiency of the upstream catalytic device. To alleviate this drawback, the second feedback controller may monitor a degree of deterioration of the upstream catalytic device and calculate the weighting factors as a function of the monitored degree of deterioration of the upstream catalytic device. Specifically, the second feedback controller decreases the weighting factor for the value of the air-fuel ratio, as measured by the second air-fuel ratio sensor, and decreases weighting factor for the value of the air-fuel ratio, as measured by the third air-fuel ratio sensor, as the degree of deterioration of the upstream catalytic device increases.

The second feedback controller may include a model in which the value of the air-fuel ratio, as measured by the second air-fuel ratio sensor is manipulated as an input, and the value of the air-fuel ratio, as measured by the third air-fuel ratio sensor is manipulated as an output. The model estimates a state variable between the input and the output using a state estimator for the model to correct the controlled parameter in the first feedback controller. Use of the model improves the accuracy of the air-fuel ratio control.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 4(*b*) is a map used to determine weighting factors for second and third sensor outputs in terms of the degree of deterioration of an upstream catalytic device;

DESCRIPTION OF THE PREFERRED EMBODIMENTS

Figure 1:
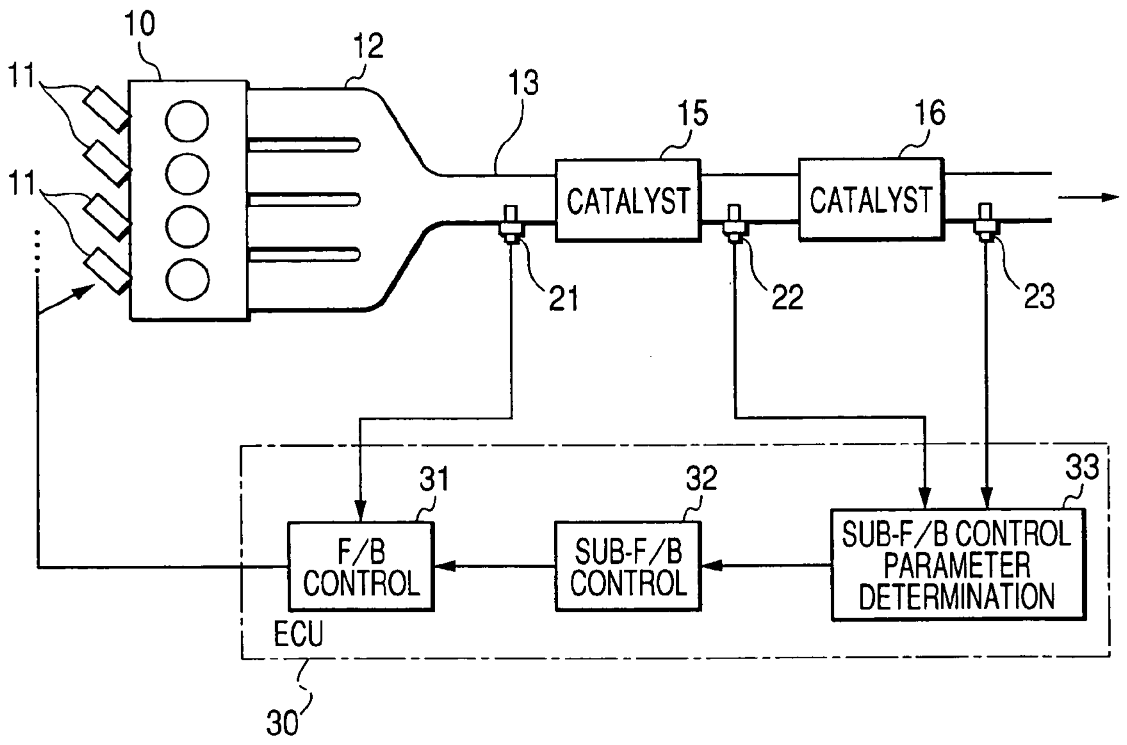
FIG. 1 is a schematic view which shows the structure of an engine control system according to the invention.

Referring to the drawings, particularly to FIG. 1, there is shown an engine control system for internal combustion engines according to the invention.

The engine control system, as illustrated, is designed for a four-cylinder gasoline engine 10 (i.e., a multi-cylinder internal combustion engine) and works to perform an air-fuel ratio control function, as will be discussed later in detail. The engine control system includes an engine electronic control unit 30 (will also be referred to as engine ECU below) which works to control the quantity of fuel to be injected into the engine 10 and the ignition timing of the fuel.

The engine 10 has solenoid-operated fuel injectors 11 (also called electromagnetic injectors) one for each cylinder. The fuel injectors 11 are installed near intake ports of the engine 10. When the fuel is injected from each of the fuel injectors 11 into a corresponding one of combustion chambers of the engine 10, it creates a mixture of sucked air and the fuel in each intake port which is, in turn, drawn into the combustion chamber upon opening of an intake valve (not shown) and burnt.

As the air-fuel mixture is burnt, emissions are exhausted into the atmosphere through an exhaust manifold 12 and an exhaust pipe 13 upon opening of an exhaust valve (not shown). In the exhaust pipe 13, an upstream catalytic device 15 and a downstream catalytic device 16 are installed which may be implemented by typical automobile catalytic converters. The upstream and downstream catalytic devices 15 and 16 each contain a three-way catalyst capable of converting CO, HC, and NOx in the exhaust gasses into harmless or less harmful products.

The engine control system also includes a first air-fuel ratio sensor 21, a second air-fuel ratio sensor 22, and a third air-fuel ratio sensor 23 which will also be referred to as A/F sensors below. The first A/F sensor 21 is disposed upstream of the upstream catalytic device 15. The second A/F sensor 22 is interposed between the upstream and downstream catalytic devices 15 and 16. The third A/F sensor 23 is disposed downstream of the downstream catalytic device 16. The first A/F sensor 21 is implemented by a linear A/F sensor designed to measure the concentration of oxygen ($O_2$) contained in the exhaust gasses linearly for determining the air-fuel ratio of a mixture to the engine over a wide range. The second and third A/F sensors 22 and 23 are each implemented by a typical $O_2$ sensor designed to output a signal as a function of an electromotive force produced between the exhaust gas and the air. This electromotive force signal usually has values which are different between fuel rich and lean regions across the stoichiometric air-fuel ratio. The first to third A/F sensors 21, 22, and 23 may be made of the same type of sensors, as described above, or NOx sensors designed to measure the concentration of NOx in the exhaust gasses as well as $O_2$.

Although not shown in drawings, the engine control system also includes an air flow meter measuring the quantity of intake air, an intake manifold pressure sensor measuring the vacuum in an intake manifold, a coolant temperature sensor measuring the temperature of engine coolant, and a crank angle sensor producing a crank position signal every time a crank shaft revolves through a given angle. These sensors may be of a typical structure, and explanation thereof in detail will be omitted here. Outputs of the sensors and the first to third A/F sensors 21 to 23 are inputted to the engine ECU 30.

The engine ECU 30 uses the outputs of the first to third A/F sensors 21 to 23 to perform air-fuel ratio feedback (F/B) control functions. In the following discussion, the outputs of the first, second, and third A/F sensors 21, 22, and 23 will also be referred to as a first, a second, and a third sensor output, respectively, for convenience. The engine ECU 30 includes an F/B controller 31, a sub F/B controller 32, and a sub F/B parameter determining circuit 33. The F/B controller 31 works to determine an actual air-fuel ratio of the engine 10 using the first sensor output and performs the F/B control to bring the actual A/F ratio into agreement with a target one. The sub F/B controller 32 works to perform sub-feedback (F/B) control, as will be described later in detail, to correct the target air-fuel ratio using a sub-feedback (F/B) parameter (i.e., a correction factor). The sub F/B parameter determining circuit 33 works to determine the sub F/B parameter using the second and third sensor outputs. The determination of the sub F/B parameter is accomplished by providing a virtual sensor output as a function of an air-fuel ratio within the downstream catalytic device 16. Specifically, the sub F/B parameter determining circuit 33 determines weighting factors K1 and K2, multiplies the second and third sensor outputs by the weighing factors K1 and K2, respectively, and add them as the virtual sensor output. The virtual sensor output is given by $$K1\times 2^{nd}\text{ sensor output}+K2\times 3^{rd}\text{ sensor output}$$

Figure 4A:
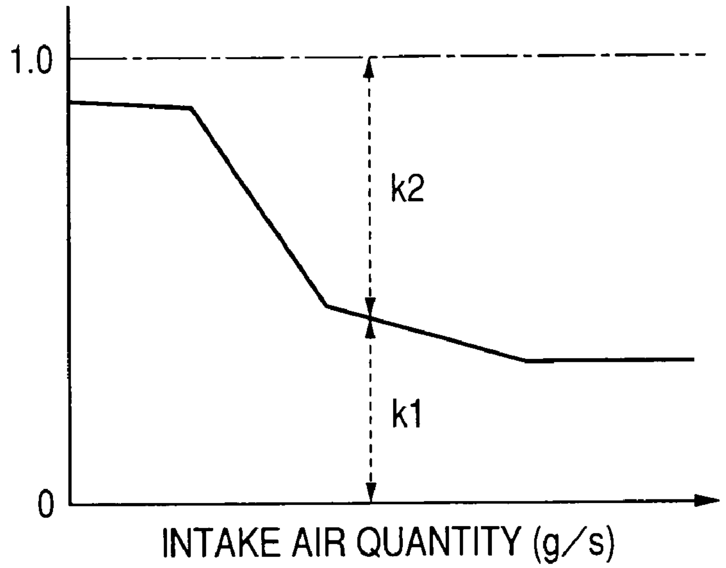
FIG. 4(*a*) is a map used to determine weighting factors for second and third sensor outputs in terms of the quantity of intake air into an engine.
Figure 4B:
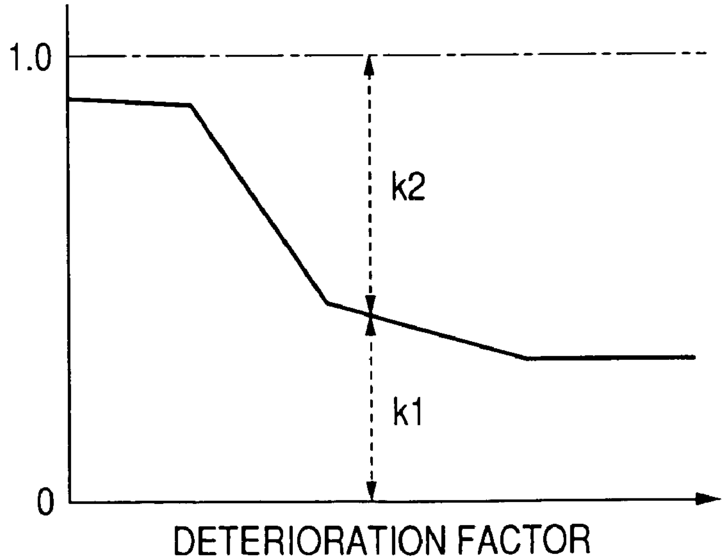

The weighting factors K1 and K2 are determined, for example, using maps as representing relations, as illustrated in FIG. 4(*a*) and 4(*b*). The relation of FIG. 4(*a*) is for deriving the weighting factors K1 and K2 as a function of an instantaneous quantity of intake air drawn to the engine 10. As the intake air quantity decreases, the weighting factor K1 is set to a greater value, while the weighting factor K2 is set to a smaller value. This is because the flow rate of exhaust gases usually depends upon the intake air quantity, thus resulting in a change in harmful emission reducing efficiency (i.e., conversion efficiency) of the upstream catalytic device 15. Specifically, when the intake air quantity is small, so that the exhaust gas quantity is small, the upstream catalytic device 15 is active enough to convert pollutant exhaust gasses into harmless products. In this case, the engine control system works to perform the sub F/B control mainly using the second sensor output. Conversely, when the intake air quantity increases, so that the exhaust gas quantity is increased, the upstream catalytic device 15 will undergo a drop in the conversion efficiency, so that unconverted emissions flow downstream of the upstream catalytic device 15. In this case, the engine control system increases the weighting factor K2 to weight the third sensor output in the sub F/B control. Instead of the intake air quantity, the speed of the engine 10, the operating load on the engine 10, or the flow rate of exhaust gasses may be used. In other words, a parameter that is a function of the flow rate of exhaust gasses may be used to determine the weighting factors K1 and K2.

The relation of FIG. 4(*b*) is for deriving the weighting factors K1 and K2 as a function of the degree of deterioration (i.e., deterioration factor) of the upstream catalytic device 15. Specifically, when the deterioration factor is smaller, that is, the degree of deterioration of the upstream catalytic device 15 is smaller, the weighting factor K1 is set to a greater value, while the weighting factor K2 is set to a smaller value. Conversely, when the deterioration factor is greater, the weighting factor K1 is set to a small value, while the weighting factor K2 is set to a greater value. This is because when the deterioration of the upstream catalytic device 15 progresses, it will result in a decrease in conversion ability of the upstream catalytic device 15, so that unconverted emissions flow downstream of the upstream catalytic device 15. Consequently, the engine control system works to weight the third sensor output greatly in the sub F/B control.

The determination of the weighting factors K1 and K2 may be accomplished using either one of the relations of FIGS. 4(*a*) and 4(*b*), but the engine control system uses both the relations in this embodiment.

The deterioration factor, as used in FIG. 4(*b*), is derived using known deterioration monitoring techniques. For example, it may be calculated as a function of a frequency or amplitude ratio of the first to second sensor output (i.e., the outputs of the first and second A/F sensors 21 and 22 disposed upstream and downstream of the upstream catalytic device 15).

Figure 2:
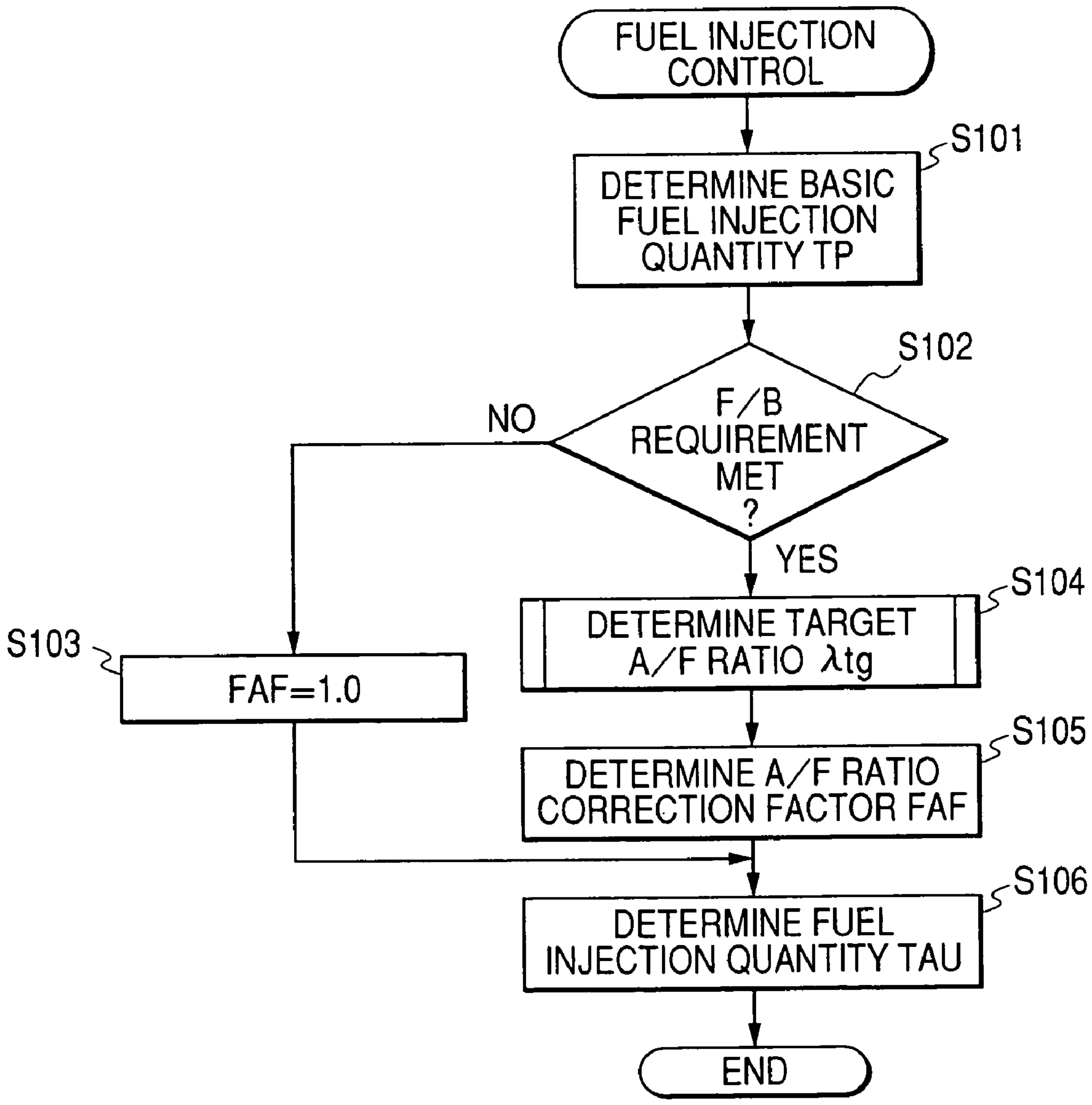
FIG. 2 is a flowchart of a fuel injection control program to be executed by the engine control system of FIG. 1.

FIG. 2 shows a flowchart of fuel injection control logical steps or program to be executed by the engine ECU 30 in the air-fuel ratio F/B control. The program is performed at a given time interval.

After entering the program, the routine proceeds to step 101 wherein a basic quantity of fuel to be injected into the engine 10 (which will referred to as a basic injection quantity TP below) is calculated as a function of an engine condition parameter(s) such as the speed and/or load of the engine 10 using a basic fuel injection quantity map.

The routine proceeds to step 102 wherein it is determined whether F/B control requirements are met or not. The F/B control requirements are (1) that the temperature of coolant for the engine 10 is greater than a given value and (2) that the engine 10 is operating out of a high-speed/high-load range. If these requirements are not satisfied, then the routine proceeds to step 103 wherein an air-fuel ratio correction factor FAF is set to 1.0. This means that the air-fuel ratio is not to be corrected in the F/B control.

If a YES answer is obtained in step 102, then the routine proceeds to step 104 wherein a target air-fuel ratio λtg is determined in a manner, as described later in detail. The routine proceeds to step 105 wherein a difference between an actual air-fuel ratio, as determined as a function of the first sensor output (i.e., the air-fuel ratio of exhaust gasses flowing into the upstream catalytic device 15) and the target air-fuel ratio λtg, as derived in step 104 is calculated to determine the air-fuel ratio correction factor FAF based on the calculated difference. The determination of the air-fuel ratio correction factor FAF is achieved using known F/B techniques such as the typical PID algorithm.

After step 105, the routine proceeds to step 106 wherein correction factors FALL other than the air-fuel ratio correction factor FAF (e.g., a coolant temperature correction factor, a learning correction factor, and a correction factor during acceleration or deceleration of the vehicle) are determined, and a required fuel injection quantity TAU is also determined using the basic fuel injection quantity TP, the air-fuel ratio correction factor FAF, and the correction factors FALL (e.g., $TAU=TP\times FAF\times FALL$).

Figure 3:
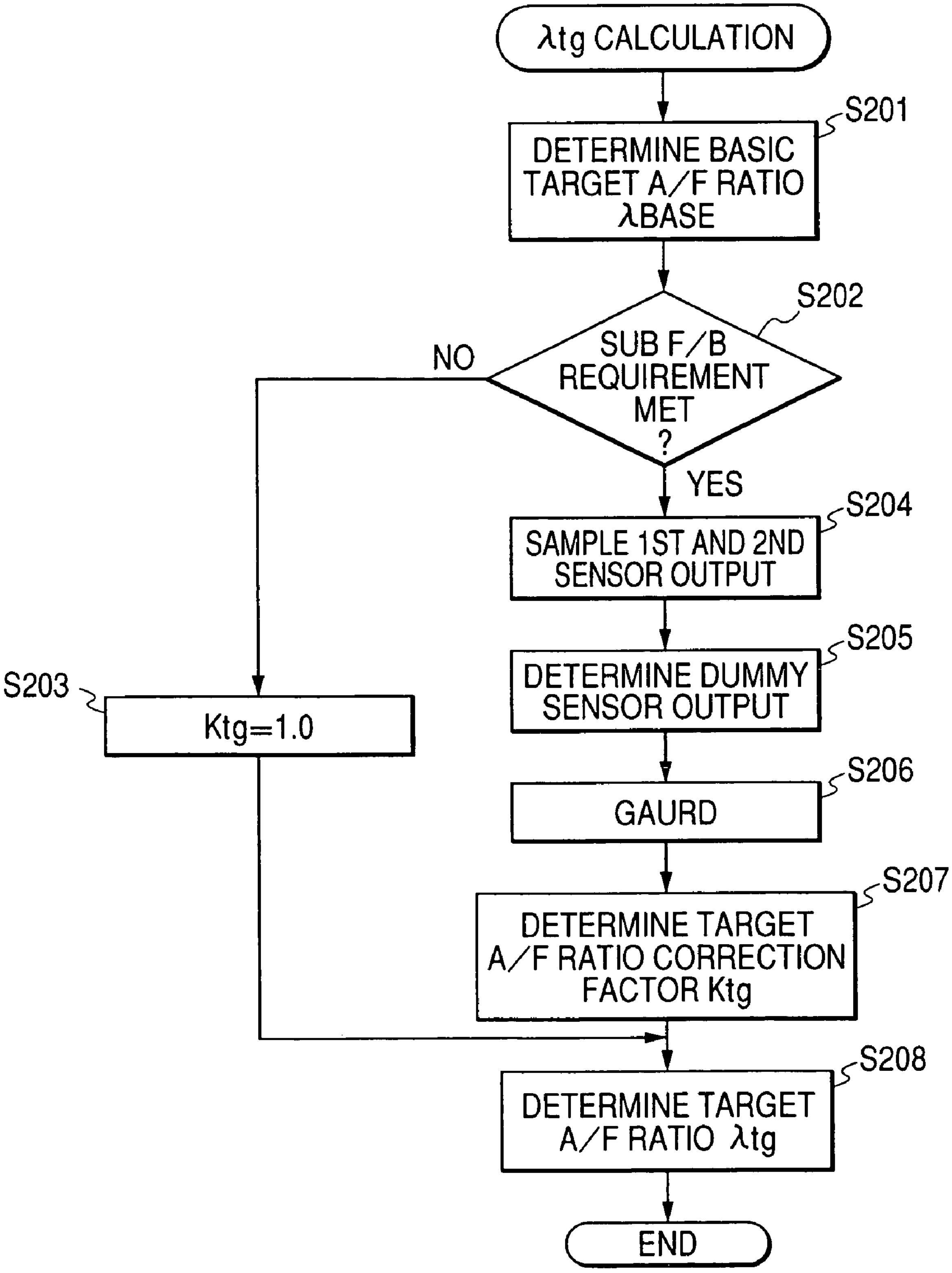
FIG. 3 is a flowchart of a sub-program to be executed in the program of FIG. 2 to determine a target air-fuel ratio.

FIG. 3 is a flowchart of a sub-program to be executed in step 104 of FIG. 2 to determine the target air-fuel ratio λtg.

First, in step 201, a basic target air-fuel ratio λbase is calculated as a function of an instantaneous value(s) of the speed and/or load of the engine 10 using, for example, a basic air-fuel ratio map stored in the ECU 30. The routine proceeds to step 202 wherein it is determined whether a sub F/B control requirement is met or not. The requirement is that the second and third A/F sensors 22 and 23 are both in an active state. If a NO answer is obtained meaning that the sub F/B control requirement is not satisfied, then the routine proceeds to step 203 wherein a target air-fuel ratio correction factor ktg is set to 1.0. This means that the target air-fuel ratio λtg is not to be corrected.

Alternatively, if a YES answer is obtained in step 202, then the routine proceeds to step 204 wherein the second and third sensor outputs are sampled. The routine proceeds to step 205 wherein the virtual sensor output is calculated as the sub F/B parameter. Specifically, the weighting factors K1 and K2 are determined using the maps, as illustrated in FIGS. 4(*a*) and 4(*b*), multiplied by the second and third sensor outputs, respectively, and summed to determine the virtual sensor output in the manner, as described above.

The routine proceeds to step 206 wherein the virtual sensor output, as derived in step 205, is subjected to a given guarding operation to omit error values of the virtual sensor output which lie out of a permissible range.

The routine proceeds to step 207 wherein a difference between the virtual sensor output, as derived in steps 205 and 206, and a target sensor output (e.g., 0.45V) is determined, and the target air-fuel ratio correction factor ktg is calculated using the determined difference. For example, the determination of the target air-fuel ratio correction factor ktg is achieved using known F/B techniques such as the typical PID algorithm. Finally, the routine proceeds to step 208 wherein the target air-fuel ratio λtg is determined using the basic target air-fuel ratio λbaes and the target air-fuel ratio correction factor ktg (i.e., λtg=λbaes×ktg).

As apparent from the above discussion, the engine control system of this embodiment works to determine the virtual sensor output using a combination of the outputs of the second and third A/F sensors 22 and 23 and employs it as the correction factor in the sub F/B control for correcting the target air-fuel ratio λtg. In other words, the engine control system works to deal with two outputs from the second and third A/F sensors 22 and 23 as a single output in correcting the target air-fuel ratio λtg. This results in simplicity of the air-fuel ratio control as compared with conventional air-fuel ratio control systems designed to perform the F/B control three times using three sensor outputs. The engine control system is, therefore, capable of controlling the air-fuel ratio of the engine 10 in a quicker response mode using the outputs of the second and third A/F sensors 22 and 23 installed upstream and downstream of the downstream catalytic device 16 without sacrificing the quality of exhaust emissions ultimately discharged outside the exhaust pipe 13.

The weighting factors K1 and K2 used in calculating the virtual sensor output are, as described above, using the operating condition of the engine 10 and the degree of deterioration of the upstream catalytic device 15, thereby controlling the exhaust emissions in a quick response to changes in the operating condition of the engine 10 and the deterioration of the upstream catalytic device 15 for an extended period.

Figure 5:
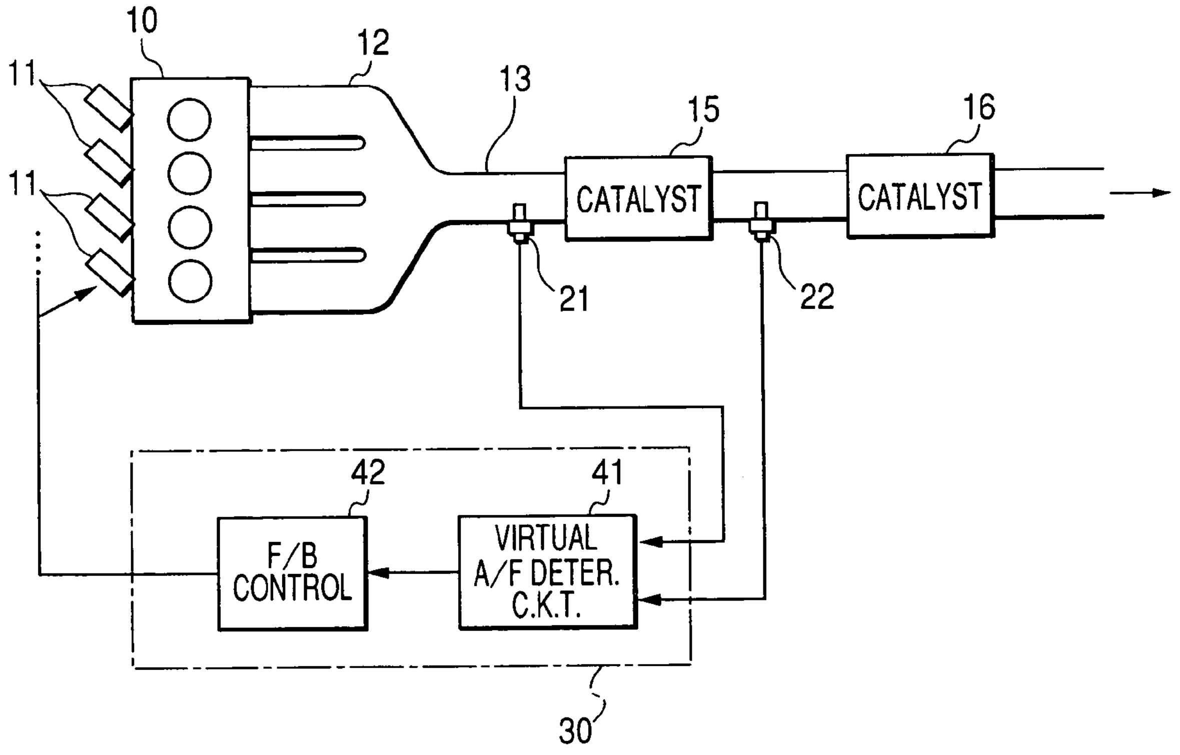
FIG. 5 is a schematic view which shows the structure of an engine control system according to the second embodiment of the invention.

FIG. 5 shows an engine control system according to the second embodiment of the invention which has only two A/F sensors: the first and second A/F sensors 21 and 22 disposed upstream and downstream of the upstream catalytic device 15.

The engine control system, as can be seen from the drawing, is a modification of the one of the first embodiment. Specifically, the upstream and downstream catalytic devices 15 and 16 are disposed in the exhaust pipe 13. The first A/F sensor 21 is located upstream of the upstream catalytic device 15. The second A/F sensor 22 is located between the upstream and downstream catalytic devices 15 and 16. Like the first embodiment, the first A/F sensor 21 is implemented by a linear A/F sensor designed to measure the concentration of oxygen ($O_2$) contained in the exhaust gasses linearly for determining the air-fuel ratio of a mixture to the engine over a wide range. The second A/F sensor 22 is implemented by a typical $O_2$ sensor designed to output a signal as a function of an electromotive force which has values different between fuel rich and lean regions across the stoichiometric air-fuel ratio.

The engine ECU 30 is designed to perform air-fuel ratio F/B control functions using outputs of the first and second A/F sensors 21 and 22. Specifically, the engine ECU 30 includes a virtual sensor output determining circuit 41 and an F/B controller 42. The virtual sensor output determining circuit 41 samples the outputs of the first and second A/F sensors 21 and 22 and determines a virtual sensor output that is a function of an air-fuel ratio within the upstream catalytic device 15. The F/B controller 42 works to performs the F/B control to bring the virtual sensor output into agreement with a target one which is a target air-fuel ratio.

The virtual sensor output determining circuit 41 is designed to determine the weighting factors K1 and K2, multiplies the first and second sensor outputs by the weighing factors K1 and K2, respectively, and add them as the virtual sensor output. Specifically, the virtual sensor output is given by $$K1\times 1^{st}\text{ sensor output}+K2\times 2^{nd}\text{ sensor output}$$

The weighting factors K1 and K2 are determined, for example, using the above described maps in FIGS. 4(*a*) and 4(*b*). The relation of FIG. 4(*a*) is for deriving the weighting factors K1 and K2 as a function of an instantaneous quantity of intake air drawn to the engine 10. As the intake air quantity decreases, the weighting factor K1 is set to a greater value, while the weighting factor K2 is set to a smaller value. Instead of the intake air quantity, the speed of the engine 10, the operating load on the engine 10, or the flow rate of exhaust gas may be used as a parameter in determining the weighting factors K1 and K2. The weighting factors K1 and K2 may also be determined using an additional parameter such as the temperature of exhaust gas from the engine 10, the temperature of the catalytic device 15, or the air-fuel ratio of a mixture to the engine 10. Specifically, the weighting factors K1 and K2 are determined based on a parameter that is a direct or indirect function of the flow rate of exhaust gas.

The relation of FIG. 4(*b*) is for deriving the weighting factors K1 and K2 as a function of the degree of deterioration (i.e., deterioration factor) of the upstream catalytic device 15. Specifically, when the deterioration factor is smaller, that is, the degree of deterioration of the upstream catalytic device 15 is smaller, the weighting factor K1 is set to a greater value, while the weighting factor K2 is set to a smaller value. Conversely, when the deterioration factor is greater, the weighting factor K1 is set to a small value, while the weighting factor K2 is set to a greater value.

The determination of the weighting factors K1 and K2 may be accomplished using either one of the relations of FIGS. 4(*a*) and 4(*b*), but the engine control system uses both the relations in this embodiment.

Figure 6:
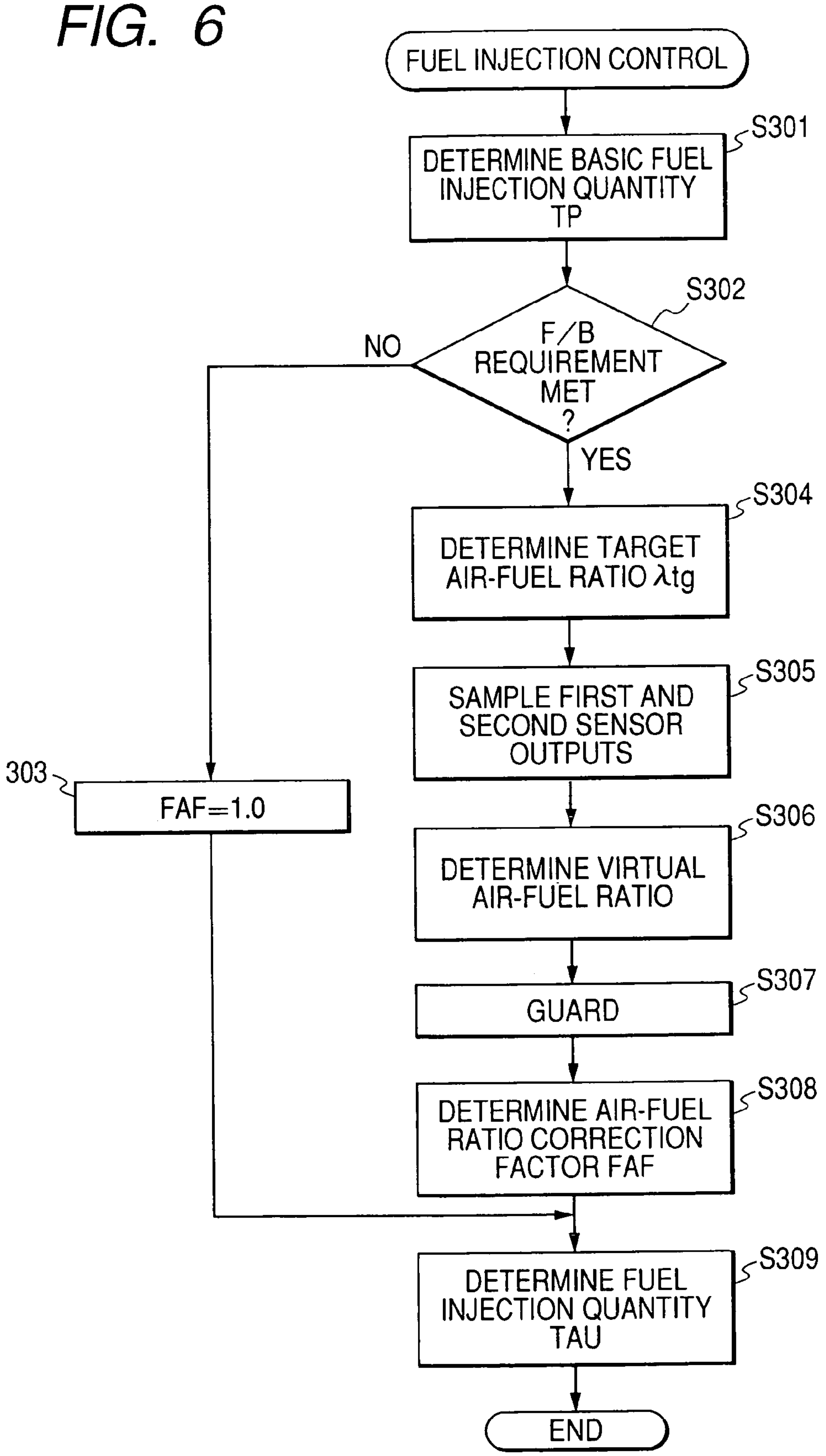
FIG. 6 is a flowchart of a fuel injection control program to be executed by the engine control system of FIG. 5.

FIG. 6 is a flowchart of a fuel injection control program to be executed by the engine ECU 30 at a given time interval to achieve the air-fuel ratio F/B control.

First, in step 301, the basic injection quantity TP is calculated as a function of an engine condition parameter(s) such as the speed and/or load of the engine 10 using a basic fuel injection quantity map.

The routine proceeds to step 302 wherein it is determined whether F/B control requirements, such as the ones in step 102 of FIG. 2, are met or not. If the requirements are not satisfied, then the routine proceeds to step 303 wherein the air-fuel ratio correction factor FAF is set to 1.0. This means that the air-fuel ratio is not to be corrected in the F/B control.

If a YES answer is obtained in step 302, then the routine proceeds to step 304 wherein the target air-fuel ratio λtg is determined as a function of instantaneous values of the speed of and the operating load on the engine 10 using the target air-fuel ratio map.

The routine proceeds to step 305 wherein the first and second sensor outputs are sampled. The first and second sensor outputs are different in type from each other. Specifically, the first sensor output is, as described above, a voltage output of the first A/F sensor 21 which changes proportional to the air-fuel ratio. The second sensor output is an electromotive force produced by the second A/F sensor 22 (i.e., the $O_2$ sensor) which changes rapidly across the stoichiometric air-fuel ratio. Therefore, at least one of the first and second sensor outputs (the second sensor output in this embodiment) is converted mathematically so that they can be compared directly with each other.

The routine proceeds to step 306 wherein the virtual sensor output is calculated in the manner as described above. Specifically, the weighting factors K1 and K2 are determined using the maps, as illustrated in FIGS. 4(*a*) and 4(*b*), multiplied by the first and second sensor outputs, respectively, and summed to determine the virtual sensor output.

The routine proceeds to step 307 wherein the virtual sensor output, as derived in step 306, is subjected to a given guarding operation to omit error values of the virtual sensor output which lie out of a permissible range.

The routine proceeds to step 308 wherein a virtual air-fuel ratio (i.e., the air-fuel ratio within the upstream catalytic device 15) is calculated using the virtual sensor output, as derived in step 306, and an air-fuel ratio correction factor FAF is determined as a function of a difference between the virtual air-fuel ratio and the target air-fuel ratio λtg, as derived in step 304.

The routine proceeds to step 309 wherein correction factors FALL other than the air-fuel ratio correction factor FAF (e.g., a coolant temperature correction factor, a learning correction factor, and a correction factor during acceleration or deceleration of the vehicle) are determined, and a required fuel injection quantity TAU is also determined using the basic fuel injection quantity TP, the air-fuel ratio correction factor FAF, and the correction factors FALL (e.g., TAU=TP×FAF×FALL).

As apparent from the above discussion, the engine control system of the second embodiment works to determine the virtual sensor output using a combination of the outputs of the first and second A/F sensors 21 and 22 and employs it as the correction factor to determine the required fuel injection quantity TAU. In other words, the engine control system works to deal with two outputs from the first and second A/F sensors 21 and 22 as a single output in correcting the basic fuel injection quantity TP. This results in simplicity of the air-fuel ratio control as compared with conventional air-fuel ratio control systems designed to perform the F/B control multiple times using three sensor outputs. The engine control system is, therefore, capable of controlling the air-fuel ratio of the engine 10 in a quicker response mode using the outputs of the first and second A/F sensors 21 and 22 installed upstream and downstream of the upstream catalytic device 15 without sacrificing the quality of exhaust emissions ultimately discharged outside the exhaust pipe 13.

The engine control system may alternatively be designed to monitor the active state of the upstream catalytic device 15 and use it in determining the weighting factors K1 and K2, thereby allowing the air-fuel ratio to be controlled effectively even before the upstream catalytic device 15 is not yet activated completely (e.g., during engine warm-up). The same applies to the structure of the second embodiment. Specifically, the weighting factors K1 and K2 for the outputs of the first and second A/F sensors 21 and 22 may be determined depending upon the active state of the upstream catalytic device 15.

Figure 7:
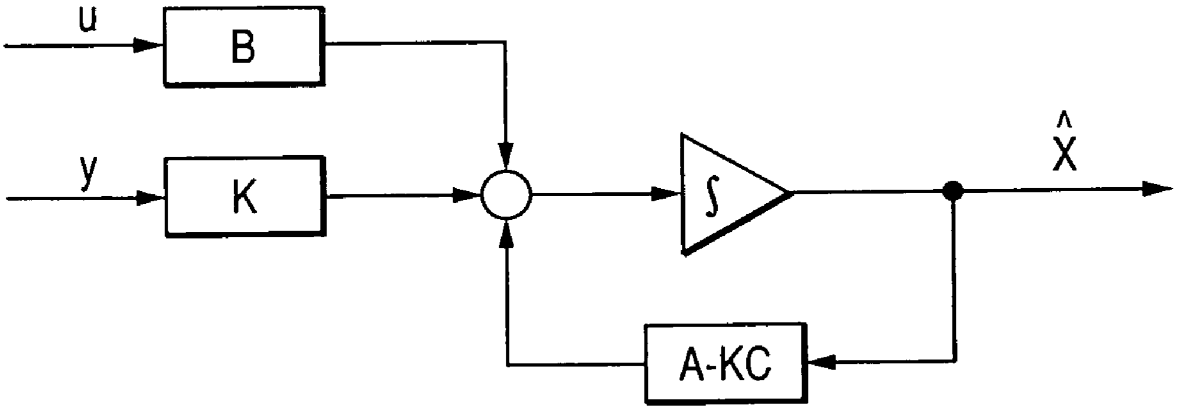
FIG. 7 is a block diagram which shows a Kalman filter observer working to provide an estimate of the air-fuel ratio of exhaust gas within a downstream catalytic device.

The engine control system of the first embodiment may alternatively be designed to calculate an estimate of the air-fuel ratio of exhaust gasses within the downstream catalytic device 16 using the second and third sensor outputs and use it as the sub F/B parameter in the sub F/B control. Specifically, an observer in which the state variable is the air-fuel ratio within the downstream catalytic device 16, is constructed in a model associated with the second and third sensor outputs to provide the estimate of the air-fuel ratio within the downstream catalytic device 16. FIG. 7 illustrates, as an example, a circuit structure of the observer using the Kalman filter.

If the second and third sensor outputs are defined as u and y, and the state variable that is the air-fuel ratio within the downstream catalytic device 16 (will also referred to as an in-catalyst air-fuel ratio below) is defined as X, the following mathematical mode is obtained.

$$\dot{X}=AX+Bu+v$$

$$Y=CX+w$$

where A, B, and C are matrix constants, and v and w indicate noises.

If the estimate of the in-catalyst air-fuel ratio X is defined as $\hat{X}$, an estimation error e is $$e=\hat{X}-X$$

An estimator which estimates the in-catalyst air-fuel ratio X from the second and third sensor outputs u and y is given by $$\begin{aligned}\dot{\hat{X}} &= (A-KC)\hat{X}+Dy+Bu\\ &= A\hat{X}+Bu-KCe\end{aligned}$$

where $K=PC^TR^{-1}$ where P is a solution of the Riccati equation, as shown below, and R is a weighting matrix, as provided by a designer.

$$PA^T+AP-PC^TR^{-1}CP+Q=0$$

where Q is a weighting matrix, as provided by the designer

From the above, we obtain the estimate X of the in-catalyst air-fuel ratio X which is used in the sub F/B control, thereby ensuring high accuracy of the sub F/B control.

The engine control system of the second embodiment may be designed to estimate a virtual air-fuel ratio between the first and second A/F sensors 21 and 22 using a model associated with the first and second sensor outputs. Specifically, the virtual air-fuel ratio (i.e., the air-fuel ratio in the upstream catalytic device 15) is determined as a controlled parameter by defining a model into which the air-fuel ratio, as detected by the first A/F sensor 21, is inputted and from which the air-fuel ratio, as detected by the second A/F sensor 22, is outputted, and estimating a state variable between the input and the output of the model using a state estimator. The use of the model results in improved control accuracy.

In the first embodiment, the virtual sensor output, that is, the target air-fuel ratio correction factor ktg (i.e., the sub F/B parameter) is, as described above, calculated using the second and third sensor outputs and used to correct the target air-fuel ratio λtg, however, it may be employed to correct the air-fuel ratio correction factor FAF.

The two catalytic devices 15 and 16 are, as clearly shown in FIG. 1, installed in the exhaust pipe 13 in the above embodiment, however, three or more catalytic devices may be used. In this case, the engine control system uses four or more A/F sensors each of which is disposed upstream or downstream of each catalytic device. Specifically, the F/B controller 31 works to determine an actual air-fuel ratio of the engine 10 using an output of the most upstream one of the A/F sensors and performs the F/B control based on a difference between the actual A/F ratio and a target one. The sub F/B parameter determining circuit 33 works to determine the sub F/B parameter (i.e., the virtual sensor output for determining the target air-fuel ratio correction factor ktd) using outputs of the second upstream and following A/F sensors for use in the sub F/B control. Specifically, weighting factors for the outputs of the second upstream and following A/F sensors are determined in a manner similar to the above. The outputs of the second upstream and following A/F sensors are then multiplied by the weighting factors, respectively, and summed to produce the virtual sensor output. For example, in a case where the number of the second upstream and following A/F sensors is three (3), that is, a total of four A/F sensors are used, three weighting factors ka1, ka2, and ka3 are determined for outputs of the second upstream and following sensors to determine the virtual sensor output. The determination of the weighting factors ka1, ka2, and ka3 is achieved preferably as a function of the degree of deterioration of the most upstream catalytic device.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. An air-fuel ratio control system for an internal combustion engine, said system comprising:

a catalytic device installed in an exhaust pipe of an internal combustion engine;

a first air-fuel ratio sensor installed in the exhaust pipe upstream of said catalytic device to measure an air-fuel ratio of an exhaust gas flowing through the exhaust pipe;

a second air-fuel ratio sensor installed in the exhaust pipe downstream of said catalytic device to measure an air-fuel ratio of the exhaust gas flowing through the exhaust pipe;

a feedback circuit working to determine a preselected controlled parameter based on the air-fuel ratios, as measured by said first and second air-fuel ratio sensors, and perform air-fuel ratio feedback control;

wherein said feedback circuit multiplies the air-fuel ratios measured by said first and second air-fuel ratio sensors by given weighting factors, respectively, to determine the controlled pararneter; and a deterioration detector working to detect a deterioration of said catalytic device, and wherein said feedback circuit determines the weighing factors based on a degree of the deterioration of said catalytic device, as detected by said deterioration detector.

2. An air-fuel ratio control system as set forth in claim 1, wherein as the degree of deterioration of said catalytic device increases, said feedback circuit decreases the weighting factor for the air-fuel ratio measured by the first air-fuel ratio sensor, while increasing the weighting factor for the air-fuel ratio measured by the second air-fuel ratio sensor.

3. An air-fuel ratio control system for an internal combustion engine, said system comprising:

a catalytic device installed in an exhaust pipe of an internal combustion engine;

a first air-fuel ratio sensor installed in the exhaust pipe upstream of said catalytic device to measure an air-fuel ratio of an exhaust gas flowing through the exhaust pipe;

a second air-fuel ratio sensor installed in the exhaust pipe downstream of said catalytic device to measure an air-fuel ratio of the exhaust gas flowing through the exhaust pipe;

a feedback circuit working to determine a preselected controlled parameter based on the air-fuel ratios, as measured by said first and second air-fuel ratio sensors, and perform air-fuel ratio feedback control;

wherein said feedback circuit multiplies the air-fuel ratios measured by said first and second air-fuel ratio sensors by given weighting factors, respectively, to determine the control led parameter; and running condition detector working to detect a running condition of the internal combustion engine, and wherein said feedback circuit determines the weighing factors based on the running condition, as detected by said running condition detector.

4. An air-fuel ratio control system as set forth in claim 3, wherein said running condition detector includes a flow rate sensor working to measure a flow rate of the exhaust gas, and wherein said feedback circuit determines the weighing factors based on the flow rate, as measured by the flow rate sensor.

5. An air-fuel ratio control system as set forth in claim 4, wherein as the flow rate of the exhaust gas increases, said feedback circuit decreases the weighting factor for the air-fuel ratio measured by the first air-fuel ratio sensor, while increasing the weighting factor for the air-fuel ratio measured by the second air-fuel ratio sensor.

6. An air-fuel ratio control system for an internal combustion engine, said system comprising:

a catalytic device installed in an exhaust pipe of an internal combustion engine;

a first air-fuel ratio sensor installed in the exhaust pipe upstream of said catalytic device to measure an air-fuel ratio of an exhaust gas flowing through the exhaust pipe;

a second air-fuel ratio sensor installed in the exhaust pipe downstream of said catalytic device to measure an air-ratio of an exhaust gas flowing through the exhaust pipe; and a feedback circuit that calculates a virtual air-fuel ratio based on the air-fuel ratios measured by the first and second air-fuel ratio sensors and performs air-fuel ratio feedback control using the virtual air-fuel ratio.

7. An air-fuel ratio control system as set forth in claim 6, wherein said feedback circuit calculates the virtual air-fuel ratio by multiplying the air-fuel ratios measured by said first and second air-fuel sensors by giving weighting factors respectively.

8. An air-fuel ratio control system as set forth in claim 6, wherein said feedback circuit calculates the virtual air-fuel ratio using a model in which the air-fuel ratio measured by said first air-fuel ratio sensor is handled as an input and the air-fuel ratio measured by said second air-fuel ratio sensor is handled as an output, and estimates a state variable between the input and output using a state estimator for the model.

9. An air-fuel ratio control system for an internal combustion engine comprising:

an upstream catalytic device installed in an exhaust pipe of an internal combustion engine;

a downstream catalytic device installed in the exhaust pipe downstream of said upstream catalytic device;

a first, a second, and a third air-fuel ratio sensor each working to measure an air-fuel ratio of an exhaust gas flowing through the exhaust pipe, said first air-fuel ratio sensor being disposed upstream of said upstream catalytic device, said second air-fuel ratio sensor being disposed between said upstream and downstream catalytic devices, said third air-fuel ratio sensor being disposed downstream of said downstream catalytic device;

a first feedback controller working to perform feedback control to bring a value of the air-fuel ratio, as measured by said first air-fuel ratio sensor, into agreement with a target air-fuel ratio; and a second feedback controller working to sample values of the air-fuel ratios, as measured by said second and third air-fuel ratio sensors, to correct a predetermined controlled parameter in the feedback control of said first feedback controller.

10. An air-fuel ratio control system as set forth in claim 9, wherein said second feedback controller calculates a virtual air-fuel ratio between the second and third air-fuel ratio sensors based on the values of the air-fuel ratios, as measured by said second and third air-fuel ratio sensor and corrects the controlled parameter in the first feedback controller using the virtual air-fuel ratio.

11. An air-fuel ratio control system as set forth in claim 9, wherein said second feedback controller includes a model in which the value of the air-fuel ratio, as measured by said second air-fuel ratio sensor is handled as an input, and the value of the air-fuel ratio, as measured by said third air-fuel ratio sensor is handled as an output and which estimates a state variable between the input and the output using a state estimator for the model to correct the controlled parameter in the first feedback controller.

12. An air-fuel ratio control system as set forth in claim 9, wherein said second feedback controller multiplies the values of the air-fuel ratios, as measured by said second and third air-fuel ratio sensor, by given weighting factors, respectively, to correct the controlled parameter in the first feedback controller.

13. An air-fuel ratio control system as set forth in claim 12, wherein said second feedback controller monitors a degree of deterioration of said upstream catalytic device, said second feedback controller determines the weighting factors as a function of the monitored degree of deterioration of said upstream catalytic device.

14. An air-fuel ratio control system as set forth in claim 13, wherein said second feedback controller decreases the weighting factor for the value of the air-fuel ratio, as measured by said second air-fuel ratio sensor, and decreases weighting factor for the value of the air-fuel ratio, as measured by said third air-fuel ratio sensor, as the degree of deterioration of said upstream catalytic device increases.

15. An air-fuel ratio control system as set forth in claim 12, further comprising an operating condition monitor working to monitor an operating condition of the internal combustion engine, and wherein said second feedback controller determines the weighting factors as a function of the operating condition, as monitored by said operating condition determining circuit.

16. An air-fuel ratio control system as set forth in claim 15, further comprising a flow rate monitor which monitors a flow rate of the exhaust gas flowing through the exhaust pipe, and wherein said second feedback controller uses the monitored flow rate as the operating condition of the engine to determine the weighting factors.

17. An air-fuel ratio control system as set forth in claim 16, wherein said second feedback controller decreases the weighting factor for the value of the air-fuel ratio, as measured by said second air-fuel ratio sensor, and decreases weighting factor for the value of the air-fuel ratio, as measured by said third air-fuel ratio sensor, as the flow rate of the exhaust gas increases.

* * * * *